(12) United States Patent
Laurion

(10) Patent No.: US 6,450,362 B1
(45) Date of Patent: Sep. 17, 2002

(54) EASILY OPENABLE COMPOST BIN AND METHOD FOR EMPLOYING SAME

(76) Inventor: Joan E. Laurion, 1511 Chandler St., Madison, WI (US) 53711

(*) Notice: Subject to any disclaimer, the term of this patent is extended or adjusted under 35 U.S.C. 154(b) by 30 days.

(21) Appl. No.: 09/825,172

(22) Filed: Apr. 3, 2001

Related U.S. Application Data

(60) Provisional application No. 60/201,535, filed on Apr. 24, 2000.

(51) Int. Cl.[7] .................................................. B65D 3/00
(52) U.S. Cl. ........................ 220/683; 220/485; 220/908
(58) Field of Search .................................. 220/683, 485, 220/489, 493, 908, 676, 592.19, 592.24

(56) References Cited

U.S. PATENT DOCUMENTS

| | | | |
|---|---|---|---|
| 3,951,294 A | * | 4/1976 | Wilson .................... 220/683 X |
| 4,211,033 A | * | 7/1980 | Ringer .................... 220/485 X |
| 4,281,813 A | * | 8/1981 | Garrity ................... 220/485 X |
| 4,457,483 A | * | 7/1984 | Gagne .................... 220/908 X |
| 5,052,570 A | * | 10/1991 | Johansen ................ 220/683 X |
| 5,056,679 A | * | 10/1991 | Lonczak ................. 220/908 X |
| 5,096,080 A | | 3/1992 | Penny |
| 5,372,269 A | | 12/1994 | Sutton et al. |
| 5,403,740 A | | 4/1995 | Menefee et al. |
| 5,427,291 A | | 6/1995 | Smith |
| 5,429,945 A | * | 7/1995 | Shain ..................... 220/908 X |
| 6,179,150 B1 | * | 1/2001 | Fogler .................... 220/485 X |

* cited by examiner

*Primary Examiner*—Steven Pollard
(74) *Attorney, Agent, or Firm*—Patricia Smith King

(57) ABSTRACT

A compost bin fitted with closure devices to allow it to be readily opened to expose the compost pile for turning, amendment and movement to a new site. Commonly available closure devices are modified and put to a new use wherein they affect the easy opening and closure of the sidewall of compost bins. This new easily opening compost bin eliminates the need to remove compost from a bin for turning. Instead the bin is removed from around the compost. Once exposed the compost pile is readily and more easily accessible to turning and amending from all sides. No heavy lifting is required in order to move, rotate or empty a compost-filled bin. Both permanent attachment of the closure devices and removable attachment are possible. Removable attachment allows the easy construction of a compost bin from hardware mesh and other mesh materials. Design elements of the solid-walled version optimize aeration of the compost without turning. Further design elements allow the compost bin's diameter and height to be adjusted to meet the requirements of the user and to accommodate a volume of compost optimal for composting.

20 Claims, 5 Drawing Sheets

EASILY OPENABLE COMPOST BIN AND METHOD FOR EMPLOYING SAME

CROSS-REFERENCE TO RELATED APPLICATIONS

This application claims the benefit of Provisional Patent Application Ser. No. 60/201,535, filed Apr. 24, 2000 under 35 USC sec. 199(e).

The present invention pertains to compost bins, and more particularly to compost bins that are economical; easily opened to facilitate access to the compost pile for maintenance and to enable the bins to be readily moved from place to place; and, easily adjustable in size and ventilation capability in order to facilitate the composting process.

For centuries gardeners have been converting organic waste into a rich soil amendment known as compost. As the organic materials decompose, they are transformed into their essential elements and serve to enrich the soils into which they are mixed.

The number of households composting today is greater than ever. Fueling the trend, is the need to reduce the amount of refuse collected into landfills and the passage by many municipalities of restrictions on their disposal. In the past, these materials have accounted for as much as 20% of the landfill contents. As a result, a large number of states and local communities are refusing to accept food, lawn and garden waste materials in landfills. The need to dispose of one's own food and yard wastes has prompted more households to begin composting to reduce the sheer volume of waste stored on their properties, if not also to actually use the resulting compost as either soil amendments to improve the quality of the soil or as mulch.

Unfortunately, the process of converting yard wastes into compost at anything other than a very slow pace, requires a gardener's hands-on attention. A bin of yard waste must be aerated properly, retain a certain moisture level, and may require that other types of ingredients be added to create the proper ratio of carbon to nitrogen for good decomposition. There is no better way to achieve the goal of aerating and accurately amending the composting material, than to actually turn and mix up the bin-full physically. By forking the yard waste of the bin over and mixing its contents, aeration is achieved and the mix can continue to decompose further. Without proper mixing and amending, the contents of a compost bin can become anaerobic, stop decomposing and/or begin to smell. Needless to say these are not desired results. An easily openable compost bin would facilitate access to the compost for turning and amendment.

Turning a compost pile is hard work and requires that a bin be emptied and the contents moved to a new location. Farmers and commercial compost producers turn their large quantities of materials with a front-end loader or other specialized machinery. For the backyard composter, however, turning compost is a difficult feat to achieve with the currently available semi-movable compost bins. The popular plastic types made in the shape of a cylinder, cone, column or ball, must be turned on their side and shoveled out, dumped in a new location, lifted up, or otherwise manipulated, to expose the compost. None open easily. All of these methods require a great deal of physical effort and at times, even two people. Other types of bins composed of wire mesh and the like are lighter in weight, but are difficult to release from the compressed compost material, often requiring the gardener to fork the contents out of the bin to a new location. This type of work is difficult for most people and particularly difficult for older people and those with disabilities. As a result, most people just leave their compost pile sit idle. This is called "cold" composting and, though it can produce a small amount of compost in 6–12 months, the amount is generally inadequate to satisfy the amounts required for gardening. Furthermore, adding kitchen scraps is not recommended with cold composting and anaerobic decomposition may occur.

In addition to the need for an easily openable and movable compost bin to facilitate aeration and amendment of the compost, there is a need for compost bins to be adjustable in size to accommodate a volume of material optimal for composting. The size of a compost bin affects the rate at which decomposition may occur under given environmental circumstances. The volume of compost optimal for decomposition may be greater under certain temperature and moisture conditions, smaller in others, but is generally at least 27 cubic feet or more. As a result, a user must be able to easily adjust the size of a compost bin to fit his or her particular circumstances, starting with a bin capable of accommodating larger volumes of compost. Unfortunately, most commercially available compost bins accommodate only 10–18 cubic feet of compost.

Finally, many compost bins already in existence are unable to open or adjust in size easily. For these, a closure device to easily and cheaply retrofit them to enable easy opening and closure, would be of great benefit.

The need and the desire to compost are already present, what is lacking is a large composter which makes the crucial step of turning the compost substantially easier. As a result, a compost bin that adjusts in size and that can be easily opened and moved to allow access to its contents is needed.

The present invention is directed to overcoming one or more of the problems as set forth above. Accordingly, it is the object of the present invention to provide an easily openable and moveable compost bin to facilitate access to its contents for easier turning and that is large enough for optimal combustion. The bin is removable from the compost eliminating the need to either remove the compost from the bin or lift the bin off. Once exposed, the compost pile is readily and easily accessible to turning and amending from all sides. No heavy lifting is required in order to move, rotate or empty a compost-filled bin, making the task achievable by more people, regardless of their physical conditioning. Closure devices that allow the bin to be quickly and easily opened and closed, allow the diameter of the bin to be varied to suit the needs of the owner and to achieve an optimal size for composting. The fasteners also allow for the easy construction of a similar compost bin from hardware mesh and other mesh materials, making its construction cheap and easy so that more people can afford to compost.

Several additional objects and advantages of the present invention are to provide:

a lightweight compost bin that may be readily closed and opened, thus allowing movement of the bin from place to place and with minimal effort, as well as stored elsewhere. Moving the bin around the garden allows planting in the fertile soil where the bin used to be as well as placement where the compost will be most needed next;

a compost bin with closure devices by which the opening and closure of the bin can be achieved with minimal effort and which prompt the user to do so more frequently for turning the compost. The closure devices also provide the ability to open and close the bin while wearing gardening gloves and have no loose pieces to be lost or mislaid in the process;

a compost bin large enough to achieve an optimal volume for combustion (generally in the range of 27–64 cu. ft.) with a large circular opening for easy filling;

means by which the diameter and height of a compost bin may be adjusted to suit the special needs of the gardener; and, closure devices that can be removably attached to either a solid plastic or wire mesh sidewall of a compost bin to allow simple construction of moveable compost bins, or to retrofit already existing compost bins to be easily opened, closed, moved and adjustable in diameter.

Further objects and advantages of the present invention will become apparent from a consideration of the drawings and ensuing description.

For a better understanding of the present invention, reference may be made to the accompanying drawings, in which.

Figure 1:
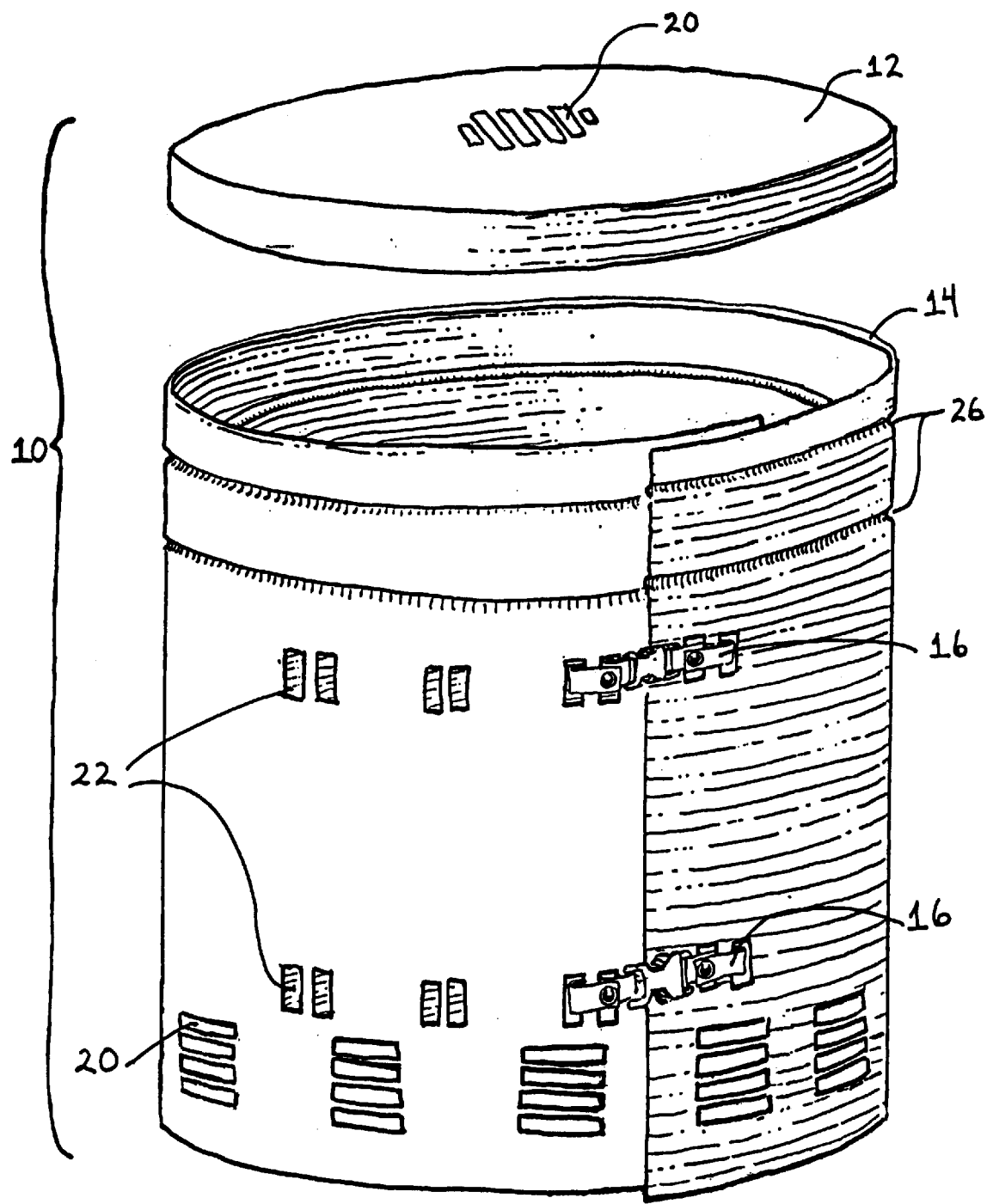
FIG. 1 is a top frontal view of a typical solid-walled compost bin and optional lid with bin ends in closed, fastened position.

Reference Numerals In Drawings 10 openable compost bin
12 removable lid
14 sidewall
16 closure device
18 releasable closure mechanism
20 ventilation holes
22 attachment slots
24 snapping mechanism
26 grooves
28 removable cover
30 center pole
32 mesh portion
34 tarp fasteners
36 tarp
38 bold
40 eyelet opening A. Detailed Description Referring now specifically to the figures, in which identical or similar parts are designated by the same reference numerals throughout, the first referring to FIG. 1, a top frontal view of a typical solid-walled compost bin and optional lid with bin sides in closed, fastened position. It should be understood that the following detailed description relates to the best presently known embodiment of the present invention. However, the present invention can assume numerous other embodiments, as will become apparent to those skilled in the art.

The openable compost bin of the present invention is generally designated by the reference numeral 10 and is shown in FIG. 1 as it might normally appear with its optional removable lid 12 raised to reveal the hollow interior formed when the side edges of the sidewall 14 of the bin are joined by a plurality of closure devices 16.

The sidewall 14 comprises a one-piece bendable wall member having a top edge, a bottom edge and opposed side edge portions. When the opposed side edge portions are joined by the closure devices 16, the sidewall forms an open-ended generally cylindrical closed-wall structure capable of standing on one end to form the compost bin 10. When one end is placed on the ground the compost bin 10 may be filled with materials.

Figure 2:
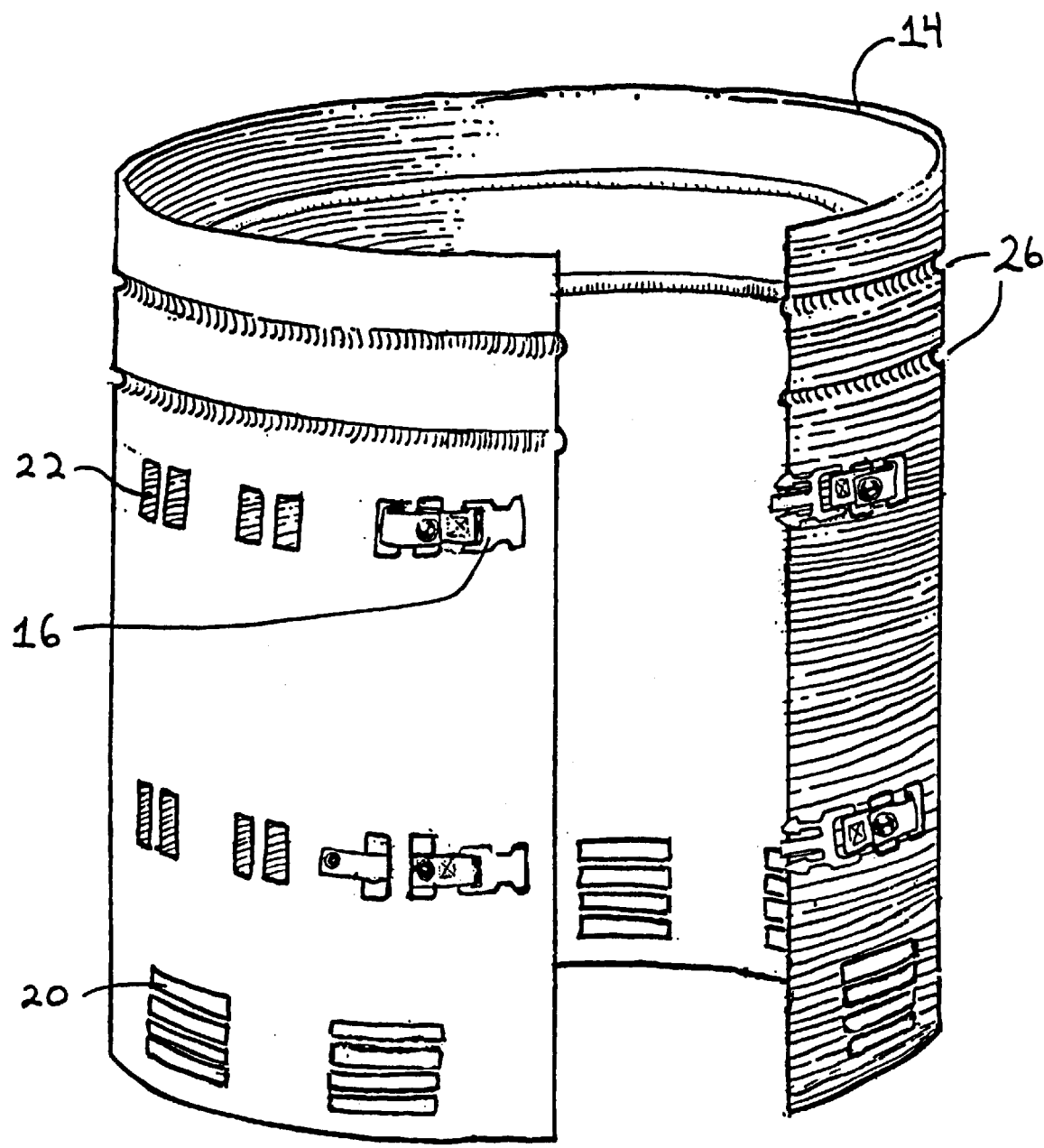
FIG. 2 is a top frontal view of the sides of a solid-walled compost bin with fasteners in the open position.
Figure 4:
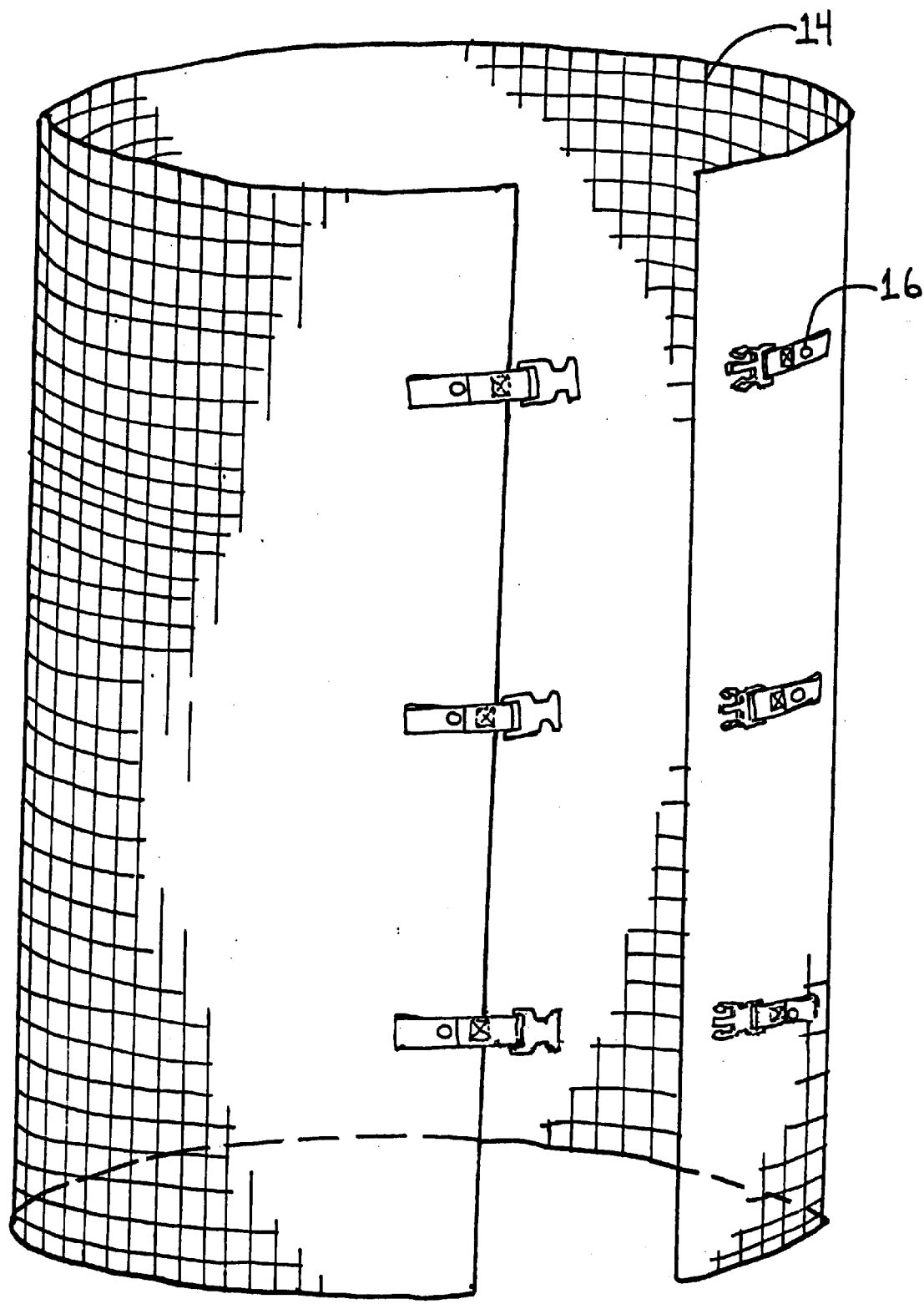
FIG. 4 is a top frontal view of the sides of a mesh-walled compost bin with fasteners.
Figure 5:
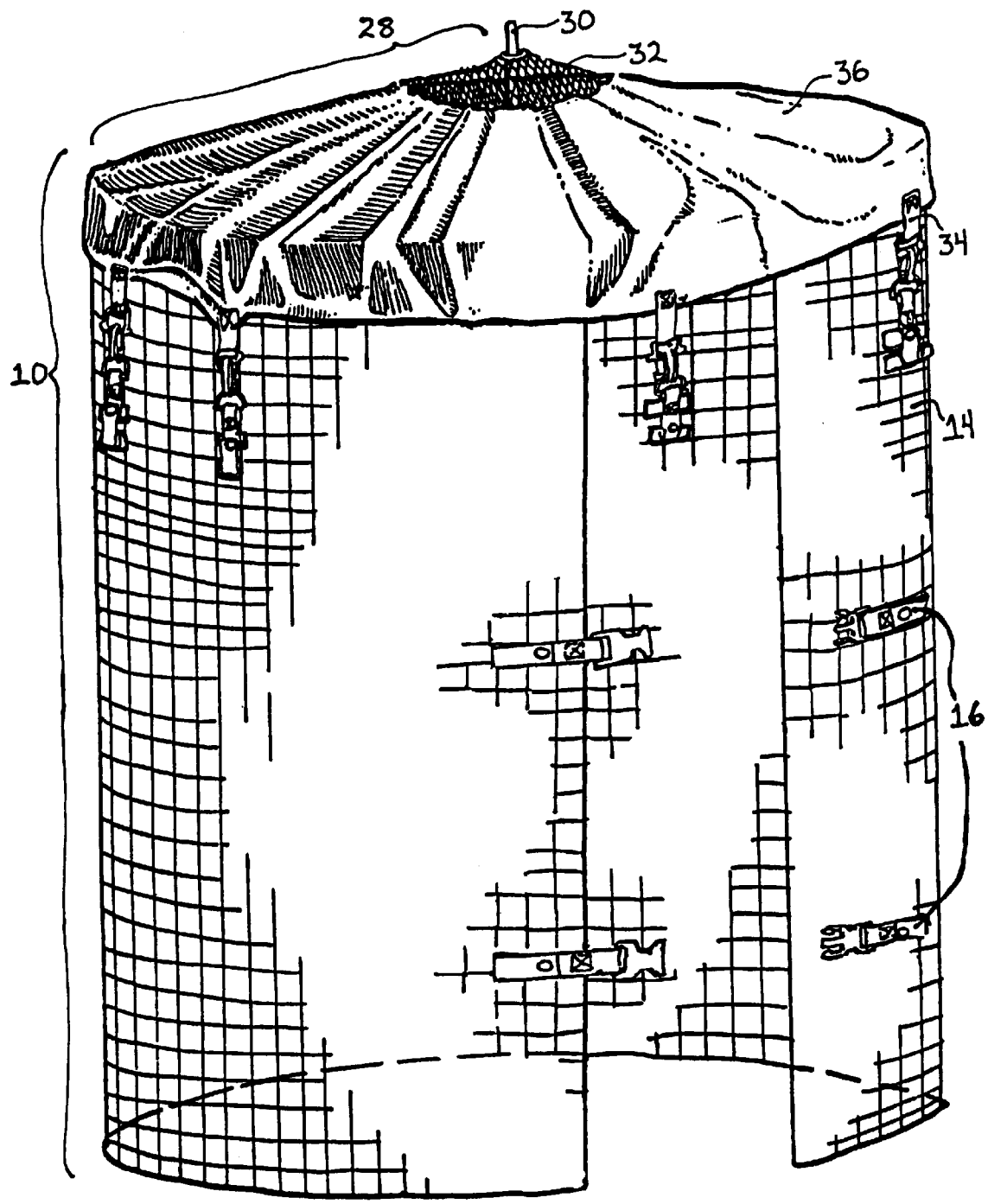
FIG. 5 is a top frontal view of the present invention showing the optional removable cover fastened thereto.

The sidewall 14 may be formed of a flexible solid material such as plastic, as depicted in FIGS. 1 and 2 or of a mesh material such as hardware cloth or welded wire as depicted in FIGS. 4 and 5. The material of the sidewall 14 should be flexible enough to hold its shape and stand upright when its side edges are fastened closed, and strong enough to withstand the pressure of the yard wastes and other compostable materials within, pushing out on the sides.

A solid sidewall 14 is capable of formation into a generally cylindrical shape when closed and outwardly flexible to facilitate its removal when opened. It may be constructed of a flexible plastic, for example, though other solid materials may be used.

The solid sidewall 14 would ideally have ventilation holes 20 for aeration as depicted in FIGS. 1 and 2 (though these are optional). Their position and number may be varied to affect optimal aeration for the desired rate of decomposition given a particular environment and type of yard waste. The sidewall 14 may be provided with pre-cut ventilation holes 20. Alternatively, the sidewall 14 may have a number of removable ventilation hole indentations to enable the customization of ventilation hole 20 number and location. In that case, the user may simply punch out the ventilation holes 20 in the numbers and locations desired to optimize the conditions for decomposition in the user's particular situation.

The removable lid 12 is optional. It may or may not contain ventilation holes 20. The ventilation holes 20, when present in the removable lid 12, allow the rising warmer air to escape the bin as decomposition of the compostable materials occurs.

The ventilation holes 20 in both the solid sidewall 14 and removable lid 12 are optional and when present, may vary in number, size and shape. In certain urban settings, for example, no openings in the form of ventilation holes 20 may be desired in order to prevent access to rodents.

Referring now to FIG. 5, a mesh sidewalled compost bin 10 is depicted fitted with an optional removable cover 28. The removable cover 28 is made of a tarp 36 of water repellent material and is elevated at center by means of a center pole 30 in order to shed rainwater more easily. The center pole 30 is sized to rise above the sidewall 14 when inserted into the center of the compost. The removable cover 28 has a center mesh portion 32 to allow the escape of warmer air as it rises from the decomposing plant matter and to promote air circulation. The removable cover 28 is sized to fit variable diameter settings of the sidewall 14 and is secured to its sides by tarp fasteners 34. The tarp fasteners 34 clip or otherwise secure the removable cover 36 to the mesh sidewall 14 where openings naturally occur. In the case of the solid sidewall 14, the tarp fasteners are secured at slots cut in the top edge portion of the sidewall 14.

Figure 3:
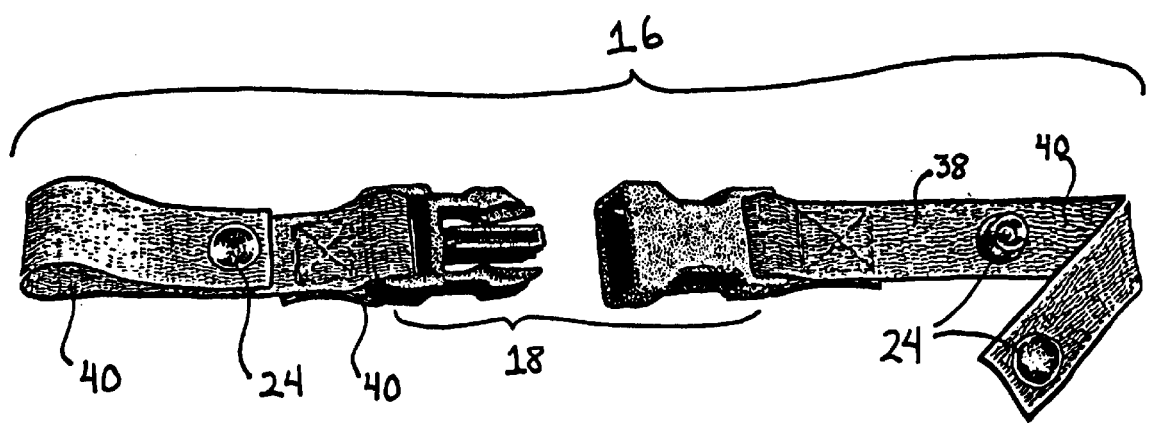
FIG. 3 is a view of the closure devices adapted for easy attachment and detachment from the sides of a compost bin.

A plurality of closure devices 16 are attached to each side edge portion of the sidewall 14. Referring to FIG. 3, a closure device 16 is depicted. Each of the closure devices 16 consists of a pair of straps 38 having opposite end portions joined by an intermediate portion, the end portions forming a proximal and distal end of the strap. In one alternative as illustrated), the proximal ends of each strap 38 have an eyelet opening 40 formed by overlapping the end portion back on itself and securing the strap end to the overlapped section of strap, generally by stitching or other means of attachment. Before closure of the eyelet opening 40, either a male or a female element of a releasable closure mechanism 18 is thread by the strap and so secured to the proximal end of the strap 38. In other alternatives, the releasable closure mechanisms 18 may be secured to the straps 38 by means other than threading through an eyelet opening 40. Once secured to the strap 38, the male and female elements may be interconnected to join the pair of straps 38, thus closing the side edges of the bin.

The distal ends of the closure devices 16 function to attach the strap 38 to the sidewall 14 of the compost bin 10. In the case of the mesh sidewall 14, the distal end of the strap is thread through an opening in the mesh and out through another, to overlap itself at some distance from the distal end. The distal end is secured to the overlapped portion of the strap 38 by a securing mechanism 24 such as the snap fastener depicted in FIG. 3.

However, in the case of the solid sidewall 14, the closure devices 16 may be attached either permanently or removably. In the case of permanent attachment, a rivet or similar device is employed to attach the distal end of the strap to the sidewall 14. In the case of the removable attachment, pairs of attachment slots 22 are cut in the sidewall 14 proximate the side edges. The distal end of the strap 38, is then threaded through the slots and secured in place as described in the preceding paragraph.

The closure devices 16 allow easy opening and closing of the compost bin 10. They also allow the compost bin's diameter to be varied, simply by altering the attachment points on the sidewall 14. In the case of the mesh sidewall 14, the closure devices 16 may be attached at almost any point. In the case of the solid sidewall 14, containing attachment slots 22, variation in the diameter of the bin is achieved by attaching the closure devices 16 at attachment slots 22 located at varying distances from the side edge portions of the sidewall 14.

The height of the sidewall 14 may also be adjusted. In the case of the mesh sidewall 14, the mesh may simply be cut to achieve the desired height. In the case of the solid sidewall 14, however, a number of grooves 26 are cut along the length of the sidewall 14, generally parallel to the top edge at varying distances therefrom. The sidewall 14 may be easily cut or otherwise separated where grooved, thus allowing the user to alter the height of the bin.

FIG. 2 shows a frontal view of the sidewall 14 of the compost bin 10 in its open position. The closure devices 16 are in their open position. When the closure devices 16 are opened, the sidewall 14 of a bin is easily removed from around the compost pile within and moved to a new location where the closure devices 16 can again be closed forming a hollow cylinder of the sidewall 14. Alternatively, the sidewall 14 may be flattened out or rolled up for easy storage. In its closed position, the compost bin 10 is again ready for use to compost. Meanwhile, the old compost remaining where the bin used to be is easily accessible to a gardener for turning.

The compost bin 10 of the present invention, thus is light in weight and allows easy opening and closing for access to the compost, removal to another location, storage, or the like. It also affords a user the ability to modify its height, diameter and ventilation potential to meet the user's particular needs. In addition, it is economical, so that more users may afford it.

B. Other Embodiments

While the above description contains many specificities, these should not be construed as limitations on the scope of the invention, but rather as an exemplification of one preferred embodiment thereof. The above-described embodiment is set forth by way of example and is not for the purpose of limiting the present invention. It will be readily apparent to those skilled in the art that obvious modifications, derivations and variations can be made to the embodiment without departing from the scope of the invention. For example, The sidewall of the present invention may be constructed of various types of rigid and flexible materials in addition to plastic;

The mesh sidewall of the present invention may be constructed out of various types of wire or other mesh including hardware cloth, chicken wire, snow fencing and the like;

The fastener devices of the present invention may be made using the easy clip device shown in the figures herein or other types of fasteners equally easy to open and close;

The means by which the fasteners are optionally attached permanently to the solid sidewall of the present invention may vary within and between types of sidewall to include various means such as rivets, glues and the like;

The means by which the fasteners are attached removably to the mesh sidewall of the permanent invention may vary also to include other attaching means besides snaps such as Velcro, buttons of various sorts and the like;

The compost bin may optionally be fitted with a top in which case, the top of the compost bin may be solid to fit a bin of a certain diameter or variable in size to accommodate different diameter bins. A tarp can be used to cover variably sized bins and could form a sort of tent top complete with center pole, air hole at center top and attaching means to secure it to the sides of the bin; and, The present invention may be open to the ground or other surface upon which it sits or may be fitted with a bottom.

Accordingly, the scope of the invention should not be determined by the embodiment illustrated.

I claim:

1. An openable compost bin, comprising:

a sidewall, comprising a one-piece bendable wall member having a top edge, a bottom edge and opposed side edge portions, said sidewall forming an open-ended generally cylindrical closed-wall structure capable of standing on one end to form said compost bin when the opposed side edge portions are joined; and, a plurality of closure devices to join said opposed side edge portions, each of said closure devices comprising:

a pair of straps, each of said straps having opposite end portions joined by an intermediate portion; said end portions forming a distal and a proximal end of said strap;

an attachment means to secure the distal end of each strap to the sidewall; and, a releasable closure mechanism having normally connected male and female elements, respectively attached to said proximal ends, and normally joining said pair of straps.

2. The closure devices of claim 1, wherein the proximal end portion of said straps further comprises an eyelet opening formed by overlapping said proximal end portion back on itself and securing the strap end extremity to overlapped part at a point spaced inwardly by a given distance from said extremity, and wherein the closure mechanism is attached to said proximal ends at the eyelet openings.

3. The sidewall of claim 1, further comprising a plurality of grooves in the wall member, the grooves extending the length of the wall member in parallel with the top edge at variable distances therefrom, to enable easy reparation of portions of the wall member along said grooves to customize the height of the sidewall.

4. The sidewall of claim 1, further comprising a plurality of ventilation holes.

5. The sidewall of claim 1, further comprising a plurality of removable ventilation hole indentations to enable the customization of ventilation hole number and location in said sidewall.

6. The openable compost bin of claim 1, further comprising a removable lid adapted to fit over said compost bin and to be in contact with said top edge of said bendable wall member.

7. The lid of claim 6, further comprising a plurality of ventilation holes.

8. The attachment means of claim 1, comprising a rivet through said distal end and said sidewall to permanently attach the strap to the sidewall.

9. The sidewall of claim 1, further comprising a plurality of attachment slots spaced in pairs at distances proximate the side edge portions of said sidewall, at which the attachment means secures the distal end of a strap to said sidewall.

10. The attachment means of claim 9, comprising an eyelet formed by threading the distal end portion of the strap through one of the pair of attachment slots and back out through the other of the pair, overlapping the distal end portion back on itself and securing the strap end extremity to overlapped part by a releasable securing mechanism at a point spaced inwardly by a given distance from said extremity.

11. The securing mechanism of claim 10, comprising a snap fastener.

12. An openable compost bin, comprising:
a sidewall, comprising a bendable mesh wall member having a top edge, a bottom edge and opposed side edge portions, said sidewall forming an open-ended generally cylindrical structure capable of standing on the end to form said compost bin when said opposed side edge portions are joined; and,
a plurality of closure devices to join said opposed side edge portions, each of said closure devices comprising:
a pair of straps, each of said straps having opposite end portions joined by an intermediate portion; said end portions forming a distal and a proximal end of said strap; each of said distal end portions having an eyelet opening formed by overlapping said end portions back on themselves and securing the strap end extremities to overlapped parts at points spaced inwardly by a given distance from said extremities;
an attachment means to secure the distal end of each strap to the sidewall, the attachment means comprising the distal end portion of the strap threaded through the mesh wall member and back out to form the eyelet opening, the strap end extremity releasably secured to the overlapped part by a securing mechanism; and,
a releasable closure mechanism having normally connected male and female elements, respectively attached to said proximal ends, and normally joining said pair of straps.

13. The closure devices of claim 12, wherein the proximal end portion of said straps further comprises an eyelet opening formed by overlapping said proximal end portion back on itself and securing the strap end extremity to overlapped part at a point spaced inwardly by a given distance from said extremity, and wherein the closure mechanism is attached to said proximal ends at the eyelet openings.

14. The securing mechanism of claim 12, comprising a snap fastener.

15. The bendable mesh wall of claim 12, comprising welded wire.

16. The bendable mesh wall of claim 12, comprising hardware cloth.

17. The openable compost bin of claim 12, further comprising a removable cover.

18. The removable cover of claim 17, comprising a tarp, a center pole insertable at a centrally located insertion point in said tarp, and a plurality of tarp fasteners to secure the tarp to the upper edge portion of said sidewall.

19. The removable cover of claim 18, further comprising a mesh portion proximate the insertion point to allow air to flow.

20. A method of employing an openable compost bin, the compost bin comprising a sidewall and a plurality of closure devices; the sidewall comprising a one-piece bendable wall member having a top edge, a bottom edge and opposed side edge portions, said sidewall forming an open-ended generally cylindrical structure capable of standing on one end to form said compost bin when the opposed side edge portions are joined; and, the plurality of closure devices joining said opposed side edge portions, each of said closure devices comprising a pair of straps, the straps having opposite end portions joined by an intermediate portion, said end portions forming a distal and a proximal end of said strap, an attachment means to secure the distal end of each strap to the sidewall, and, a releasable closure mechanism having normally connected male and female elements, respectively attached to said proximal ends, and normally joining said pair of straps; the method of employing the openable compost bin, comprising:
installing the openable compost bin at a desired location, comprising:
securing the distal end of each strap of a closure device to the sidewall at a point proximate the edge portion, each strap of a pair of straps secured to opposed edge portions; and,
joining the two opposed edge portions by joining the releasable closure mechanisms of each of said plurality of closure devices;
opening the compost bin by releasing the releasable closure mechanisms of each of said plurality of closure devices; and, reinstalling the openable compost bin.

* * * * *